Oct. 8, 1968  C. B. RYAN  3,404,412
COMBINATION HAND AXE AND SHOVEL
Filed Feb. 28, 1967
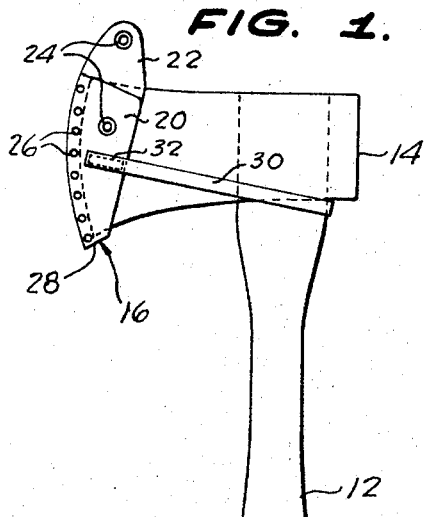
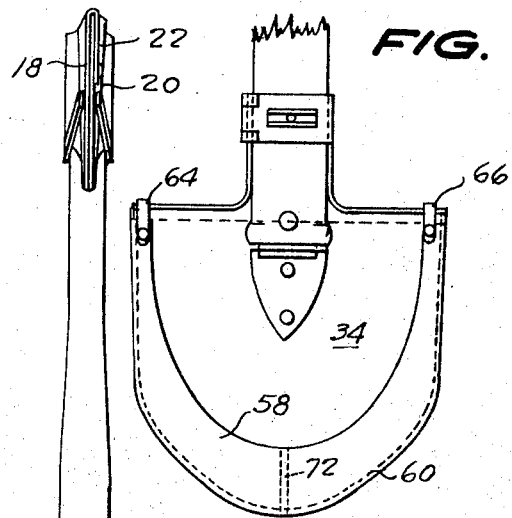
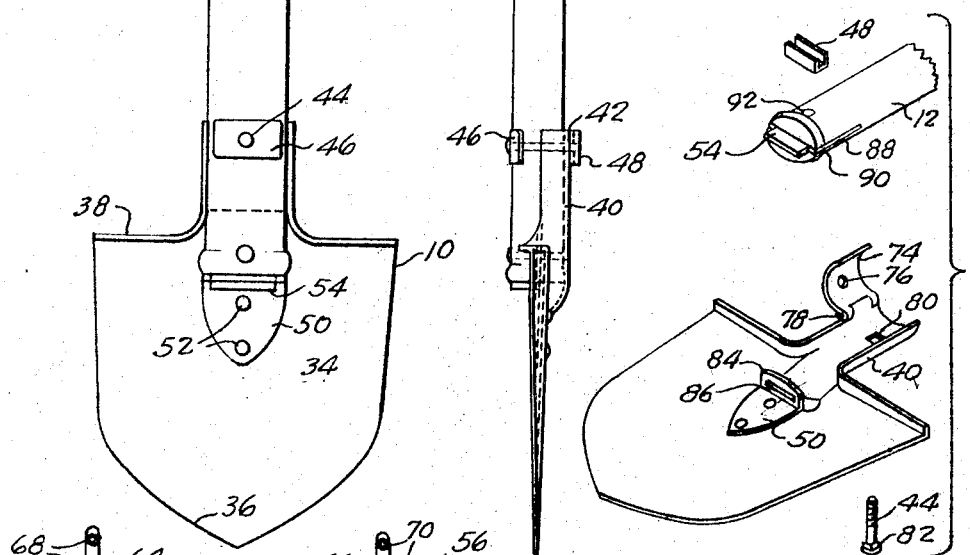
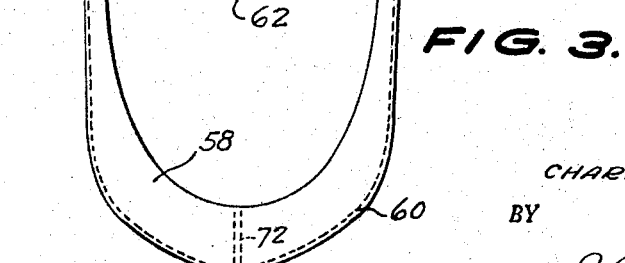
INVENTOR.
CHARLES B. RYAN,
BY
Kimmel, Crowell & Weaver.
ATTORNEYS.

United States Patent Office 3,404,412
Patented Oct. 8, 1968

3,404,412
COMBINATION HAND AXE AND SHOVEL
Charles B. Ryan, Rte. 2, Box 371,
Creswell, Oreg. 97426
Filed Feb. 28, 1967, Ser. No. 619,388
4 Claims. (Cl. 7—14.55)

ABSTRACT OF THE DISCLOSURE

A combination tool having a common handle with a hatchet head at one end and a shovel blade secured at the other end by a concave extension on the blade and a lug receiving member on the blade which respectively receives the end of the handle and a lug on the end of the handle for securing the blade to the handle is disclosed.

Background of the invention

*Field of the invention.*—This invention relates to hand tools and more particularly relates to combination hand tools of the type having in combination a cutting edge and a digging edge such as a hatchet and shovel combination.

*Description of the prior art.*—Combination tools are well known in the prior art for cutting, digging, drilling, and performing other operations. Generally, however, such combination tools have been developed at considerable sacrifice to the utility of the individual tools and to the convenience of using the individual tools. Some such devices are unduly complicated and unnecessarily expensive as well. With regard to tools used for digging and cutting such as are commonly used by campers, soldiers and other military personnel, combination shovels and cutting or digging tools are known. One such tool is disclosed in Patent No. 2,377,730, issued to Vosbikian et al. Another such tool is disclosed in Patent No. 576,756, issued to Cole. A combination entrenching tool somewhat related to the present invention is also disclosed in Patent No. 2,830,307, issued to Worden.

While using a digging or trenching tool such as a shovel it is not particularly inconvenient to have a combination element on the other end of a common handle, such as a hatchet head. On the other hand, however, it is extremely inconvenient to try to use a hatchet which has a shovel on the other end of a common handle from the hatchet head. It is, therefore, with this disadvantage in mind, that the present invention comprises a combination tool which has a common handle with a hatchet head fixed on one end and a shovel blade removably fixed at the other end.

Summary

The present invention relates to a combination tool especially designed for use by hikers, campers, soldiers, military personnel in general, and for use by individuals who only occasionally have need for a cutting and digging tool such as picnickers and the like. The present invention is designed to overcome the disadvantages of having a combination tool which includes a hatchet or axe head on one end of a common handle and a shovel head or blade on the other end of the common handle. Such tools are inconvenient to handle for chopping operations. On the other hand, the present invention comprises a common handle having a shovel on one end which may be removed during periods of non-use and which may be attached for use.

In particular, an object and important feature of the present invention is the design of the shovel blade and the shovel blade extension and means for securing the shovel blade to the end of a common handle. This permits the blade to be carried separately in a convenient location or to be carried in combination with a common handle.

In either event, the shovel blade may be removed to permit chopping without inconvenience.

Other important features and objects of the invention comprise the specific constructional features of the shovel blade and means for connecting the shovel blade to the end of a handle and to scabbards for the shovel and for the hatchet cutting edge. Other objects will become apparent from the following specification and from the drawings.

Brief description of the drawing

FIGURE 1 is a side view of the overall combination tool of this invention.

FIGURE 2 is a side view of the overall combination tool of this invention taken substantially at right angles with respect to the view of FIGURE 1.

FIGURE 3 is a detail of a scabbard for the shovel blade of this invention.

FIGURE 4 is a detail of the scabbard shown in place on the shovel blade and of a modification and preferred embodiment of the shovel blade of the invention.

FIGURE 5 is an exploded view in detail of the preferred embodiment of the shovel blade and means for connecting the shovel blade to the handle.

Description of the preferred embodiments

This invention relates to a combination tool of the type having a shovel blade 10 on a handle 12 in common with another tool such as a hatchet head 14. As shown in FIGURES 1 and 2, the shovel blade 10 is connected at one end of handle 12 and the hatchet blade is connected at the other end. In the preferred embodiment, the hatchet blade 14 may be fixedly secured to the other end of handle 12.

The invention also comprises a scabbard 16 for the hatchet head cutting edge. The scabbard 16 comprises a pair of generally flat flexible members 18 and 20 with a flap 22 extending from the upper edge of member 18. Means such as a snap pair 24 are provided on the flap and on the member 22 for securing the flap over the upper end of hatchet head 14. Means such as rivets 26 and sewing 28 are provided to secure the outer edge and bottom respectively of the flexible members together. A strap 30 is secured at its ends 32 to the members 18 and 20. Strap 30 extends around handle 12 in the manner shown to prevent the removal of scabbard 16 from the handle 12.

Shovel blade 10 comprises a digging surface member 34 having a distal digging edge 36 and a proximate more rigid edge 38. As shown in FIGURES 1 and 2, a concave extension 40 having an aperture 42 therein is secured to the cutting surface 34 or may be formed integrally therewith as desired. The concave member 40 is shaped and adapted to receive the end of handle 12.

The most important feature of the invention relates to the shape of the shovel blade and the means for connecting it to the end of the handle. The means includes, in addition to extension 40 which is adapted to receive the end of the handle, an elongate securing member such as a bolt 44 and a clamping member 46, clamping member 46 being received on the opposite side of the handle from the concave member 40. A wing nut 48 is received on the threaded end of bolt 44.

In addition to this securement it is necessary to provide a securement at the end of the handle. In a preferred embodiment, this is accomplished by a lug receiving member 50 which is secured to the digging surface 34 by a plurality of rivets 52 and receives a lug 54, which will be described in greater detail with respect to FIG. 5.

A scabbard 56 is provided which comprises a pair of U-shaped flexible members 58 which are sewn together at 60 along the outer edge of the U-shaped portions. The strap 62 secures together the ends of the U-shaped member and a pair of straps 64 and 66 which include snaps 68 and 70 extend from the ends of the U-shaped member for being received over the approximate edge of shovel blade 10 in the manner shown in FIG. 4. The nap of the flexible material may be sewn together, if desired, as shown at 72 to provide increased rigidity and strength.

As shown in FIG. 4 and better shown in FIG. 5, the preferred embodiment of the invention includes a movable clamp member 74 which is provided with an aperture 76 which is hingeably mounted at one edge thereof to the edge of concave extension 40 as shown at 78. Also, an aperture 80 which is noncircular is provided in concave member 40 and the bolt 44 is provided with a noncircular complementarily formed portion 82 for being received in aperture 80 to prevent the bolt from turning. A wing nut 48 is received on the other end of the bolt in the same manner.

The lug receiver member 50 comprises a portion which is bolted or riveted to the shovel blade by rivets 52 and includes a generally vertically extending portion 84 which is provided with a lug receiving slot 86 to receive lug 54.

Lug 54 is an extension of a generally planar member 88 which is received in a slot 90 in the end of handle 12, as shown in FIG. 5. A pin or bolt 92 is provided to fix planar member 88 in slot 90.

Thus it will be seen that the shovel blade 10 may be removed from the end of the handle to permit the handle to be used in conjunction with hatchet head 14 without interference from the shovel blade. It is a particularly important feature of this invention that the shovel blade may be easily and quickly removed from the end of the handle using only sturdy rigid and easily manufactured components.

It will be understood that while the invention has been described, summarized, and abstracted with respect to specific preferred embodiments, the specific embodiments are intended as merely exemplary of the present invention and are not intended in a limiting sense. Accordingly, variations in construction and in details will be obvious to those skilled in the art and may be made in view of the present drawings and disclosure without departing from the spirit and scope of the invention as defined and limited in the following claims.

I claim:

1. In a combination tool of the type having a shovel blade on a handle with another tool, the improvement which comprises:
   an apertured concave extension on the shovel blade adapted snugly to receive an end of the common handle;
   a generally flat member secured against the surface of the shovel blade having an apertured lug receiving extension integral therewith extending substantially perpendicularly from said flat member and said shovel blade, said aperture being generally rectangular and being adapted to receive a securing lug;
   a generally planar member having a lug extension on an end, said planar member being received in a slot in the end of said handle with said lug extending from the end of the handle for normally being received in the lug receiving aperture; a concave member adapted to receive the end of the handle on the opposite side thereof from said concave extension; means hingeably securing said concave member to said concave extension; and
   elongate removable securing means extending through an aperture in said handle, said apertured concave extension and an aperture in the hingeably secured concave member for cooperating with said lug and said lug receiving means for securing said shovel blade to said handle.

2. The invention of claim 1 wherein:
   the concave extension has a non-circular aperture therethrough; and
   said elongate securing means comprises,
      a bolt,
      a complementarily noncircular portion on one end for being received in said noncircular aperture to prevent rotation of said bolt in said aperture, and
      threads on the other end of said bolt for removably receiving a nut;
   and further comprising:
      a nut removably received on the other end of said bolt.

3. The invention of claim 2 wherein:
   the other tool on said handle comprises a hatchet head received on the other end of said handle;
   and further comprising:
      a protective scabbard removably received on the cutting edge of said hatchet head, said scabbard comprising,
         a pair of opposed flexible generally flat members,
         means securing the bottom and one edge of said members together,
         a flap extending from the top edge of one of said members,
         means on the other of said members for securing the flap thereto, and
         a strap secured at each end to the respective members, said strap extending around said handle to thereby prevent removal of said scabbard from said handle.

4. The invention of claim 3 further comprising:
a scabbard removably received on the distal edge of the shovel blade, said scabbard comprising,
   a pair of generally U-shaped flat flexible members,
   means securing said members together along the outer edge of said U-shape,
   a pair of straps extending from the ends of said U-shaped combination of flexible members,
   means for removably securing the free ends of said straps over the proximate edge of said shovel blade, and
   a strap interconnecting the ends of said U-shaped combination of flexible members.

References Cited

UNITED STATES PATENTS

| | | | |
|---|---|---|---|
| 1,068,792 | 7/1913 | MacKintosh | 7—14.55 |
| 1,281,612 | 10/1918 | McBreen | 306—25 |
| 1,229,667 | 6/1917 | Stimecz. | |
| 1,326,108 | 12/1919 | Seelye | 306—18 |
| 2,696,294 | 12/1954 | Tarnay | 7—14.55 X |
| 450,449 | 4/1891 | Daly | 306—31 X |

FOREIGN PATENTS 55,721   10/1913   Austria.

ROBERT C. RIORDON, *Primary Examiner.*

R. V. PARKER, Jr., *Assistant Examiner.*